US009001232B2

(12) United States Patent
Tatsumi (10) Patent No.: US 9,001,232 B2
(45) Date of Patent: Apr. 7, 2015

(54) IMAGE PROCESSING APPARATUS, DISPLAY APPARATUS AND IMAGE CAPTURING APPARATUS, WITH MOVING IMAGE INCLUDING PLURAL FRAMES OF IMAGES ALTERNATELY CAPTURED WITH DIFFERENT EXPOSURES INCLUDING CORRECT AND INCORRECT EXPOSURES (71) Applicant: Canon Kabushiki Kaisha, Tokyo (JP)

(72) Inventor: Eisaku Tatsumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/915,735

(22) Filed: Jun. 12, 2013

(65) Prior Publication Data
US 2013/0271622 A1 Oct. 17, 2013

Related U.S. Application Data (62) Division of application No. 13/080,892, filed on Apr. 6, 2011, now abandoned.

(30) Foreign Application Priority Data

Apr. 13, 2010 (JP) ................. 2010-092541

(51) Int. Cl.
H04N 5/235 (2006.01)
(52) U.S. Cl.
CPC ........... *H04N 5/2353* (2013.01); *H04N 5/2355* (2013.01); *H04N 5/2356* (2013.01)
(58) Field of Classification Search
CPC . H04N 5/2355; H04N 5/2353; H04N 5/2356; H04N 5/33; H04N 9/04

USPC .................. 348/229.1, 222.1, 164
See application file for complete search history.

(56) References Cited

U.S. PATENT DOCUMENTS

| 7,474,168 | B2 | 1/2009 | Tatsumi |
| 2006/0007341 | A1 | 1/2006 | Nakamura et al. |
| 2006/0029365 | A1 | 2/2006 | Hamasaka |
| 2006/0262363 | A1 | 11/2006 | Henley |
| 2007/0097266 | A1* | 5/2007 | Souchard ............ 348/571 |
| 2008/0291289 | A1 | 11/2008 | Kurane |
| 2009/0067752 | A1 | 3/2009 | Lee et al. |
| 2009/0175535 | A1* | 7/2009 | Mattox ............ 382/164 |
| 2010/0215348 | A1 | 8/2010 | Saito |
| 2011/0102479 | A1 | 5/2011 | Kitada et al. |

FOREIGN PATENT DOCUMENTS

| JP | 11-317905 A | 11/1999 |
| JP | 2001-320613 A | 11/2001 |

(Continued)

*Primary Examiner* — Antoinette Spinks
(74) *Attorney, Agent, or Firm* — Fitzpatrick, Cella, Harper & Scinto (57) ABSTRACT

An image processing apparatus for generating a high dynamic range image using a plurality of images obtained by capturing images of a same object with different exposure values, has: an input unit for inputting a correctly exposed image generated with correct exposure and an incorrectly exposed image generated with exposure other than the correct exposure; a filter unit for performing low pass filter processing on the incorrectly exposed image; and a composition unit for generating a high dynamic range image by composing an output image of the filter unit with the correctly exposed image.

5 Claims, 11 Drawing Sheets (56) References Cited

FOREIGN PATENT DOCUMENTS

| JP | 2003158669 A | * | 5/2003 | ............ H04N 5/235 |
| JP | 2004-048445 A | | 2/2004 | |
| JP | 2006-033033 A | | 2/2006 | |
| JP | 2006-345509 A | | 12/2006 | |
| JP | 2008-236726 A | | 10/2008 | |
| JP | 2009-071821 A | | 4/2009 | |
| JP | 2009-098718 A | | 5/2009 | |

* cited by examiner

IMAGE PROCESSING APPARATUS, DISPLAY APPARATUS AND IMAGE CAPTURING APPARATUS, WITH MOVING IMAGE INCLUDING PLURAL FRAMES OF IMAGES ALTERNATELY CAPTURED WITH DIFFERENT EXPOSURES INCLUDING CORRECT AND INCORRECT EXPOSURES

This application is a division of application Ser. No. 13/080,892 filed Apr. 6, 2011.

BACKGROUND OF THE INVENTION

1. Field of the Invention

The present invention relates to a processing technology for a still image and a moving image in order to expand a dynamic range of an image to be displayed or printed.

2. Description of the Related Art

While the dynamic range of human eyes reaches the 6th to 10th power of 10 (including adaption), the dynamic range in a normal digital photograph is only around the 4th power of 10. Therefore even if an image is captured with setting a correct exposure, blown out highlights and blocked up shadows often appear.

A method of solving this problem is generating a high dynamic range photograph by taking a plurality of photographs with different exposure values in advance, and composing them (see Japanese Patent Application Laid-Open No. 2008-236726 and No. 2006-345509). In the case of moving images, a certain degree of blown out highlights or blocked up shadows can be decreased by adjusting the gamma curve in a dark portion and a bright portion, and this function is called "knee adjustment".

A prior art of generating a photograph in a high dynamic range will be described with reference to FIG. 9, FIG. 10A and FIG. 10B.

Figure 9:
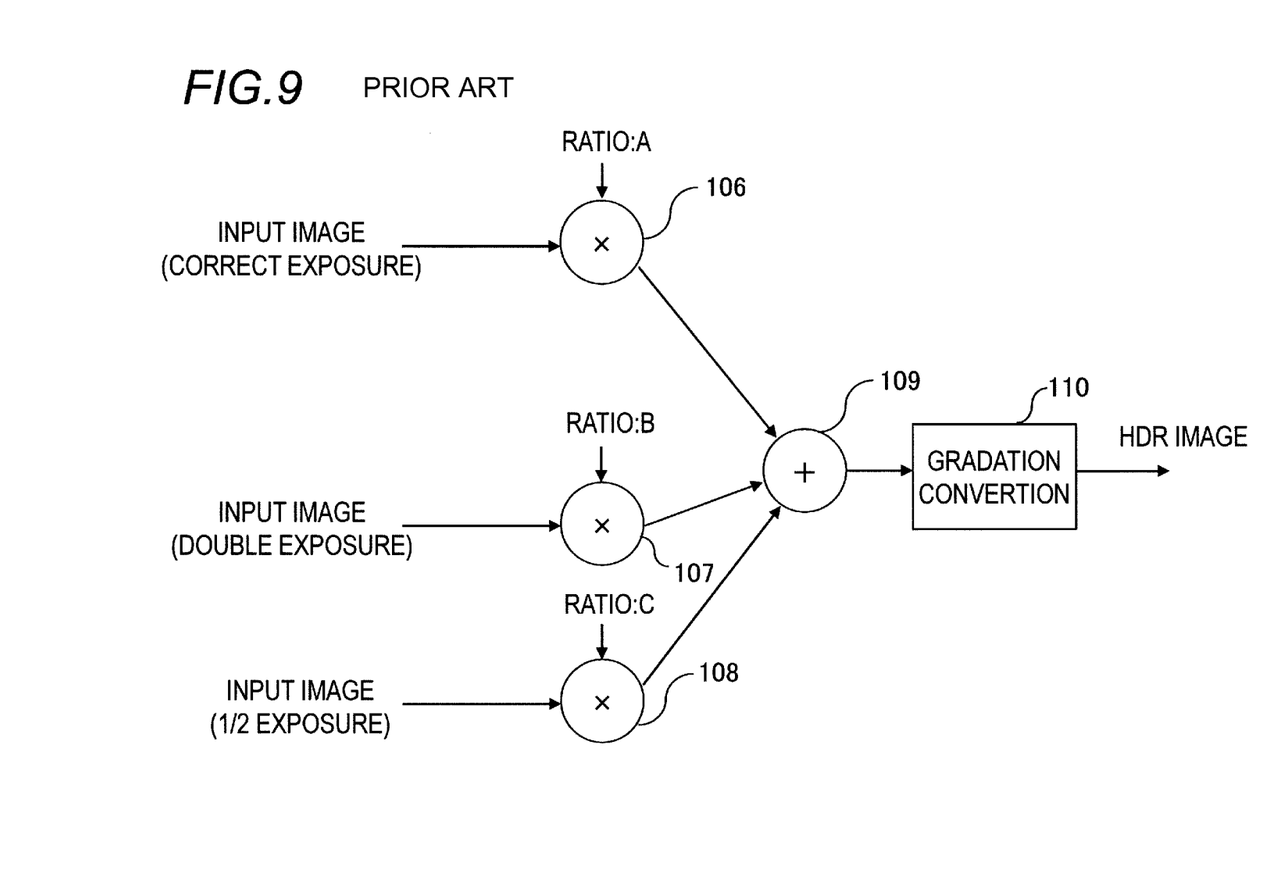
FIG. 9 is a functional block diagram for generating an HDR image according to a prior art.

FIG. 9 is a functional block diagram for generating an image in a high dynamic range according to a prior art. In FIG. 9, 106 denotes a functional block for multiplying a correctly exposed image by a ratio for use A, 107 denotes a functional block for multiplying an overexposed image by a ratio for use B, and 108 denotes a functional block for multiplying an underexposed image by a ratio for use C. 109 denotes an addition block for adding three images, and 110 denotes a gradation conversion block for decreasing or increasing a number of gradation levels of an image to a number of gradation levels which is appropriate for an output image.

Three types of input images (correct exposure, overexposure, underexposure) are input from an input unit, which is not illustrated. A gradation value of each input image is a value generated by digitizing an output voltage of an image sensor which captured an image with each of the three types of exposures, and corresponds to the later mentioned reference numbers 111 to 113 in FIG. 10A respectively.

Then the functional blocks 106, 107 and 108 multiply the three types of images (correct exposure, overexposure, underexposure) by individual ratios (ratio: A, ratio: B, ratio: C) respectively. These images are added by the addition block 109 (linear composition). In this case, gradation values at the correct exposure and the overexposure are added in a dark side, and gradation values at correct exposure and underexposure are added in a bright side. As a result, a number of gradation levels to be output for a brightness to be input increases (high dynamic range).

Finally a gradation conversion block 110 adjusts a number of gradation levels of the image. For this, a processing to match the number of gradation levels with a required number of gradation levels is performed. The gradation conversion block 110 is normally constituted by a multiplier.

In this way, a high dynamic range image is obtained.

Figure 10A:
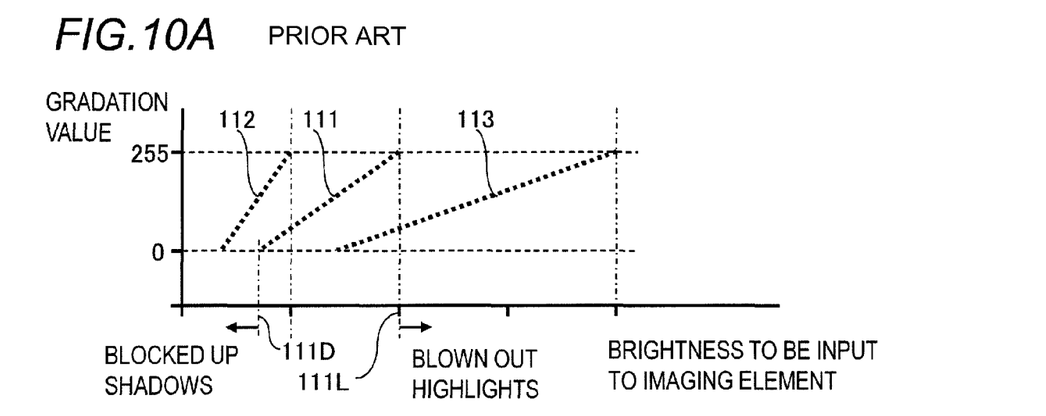
FIG. 10A and FIG. 10B are graphs depicting how to generate an HDR image according to a prior art.
Figure 10B:
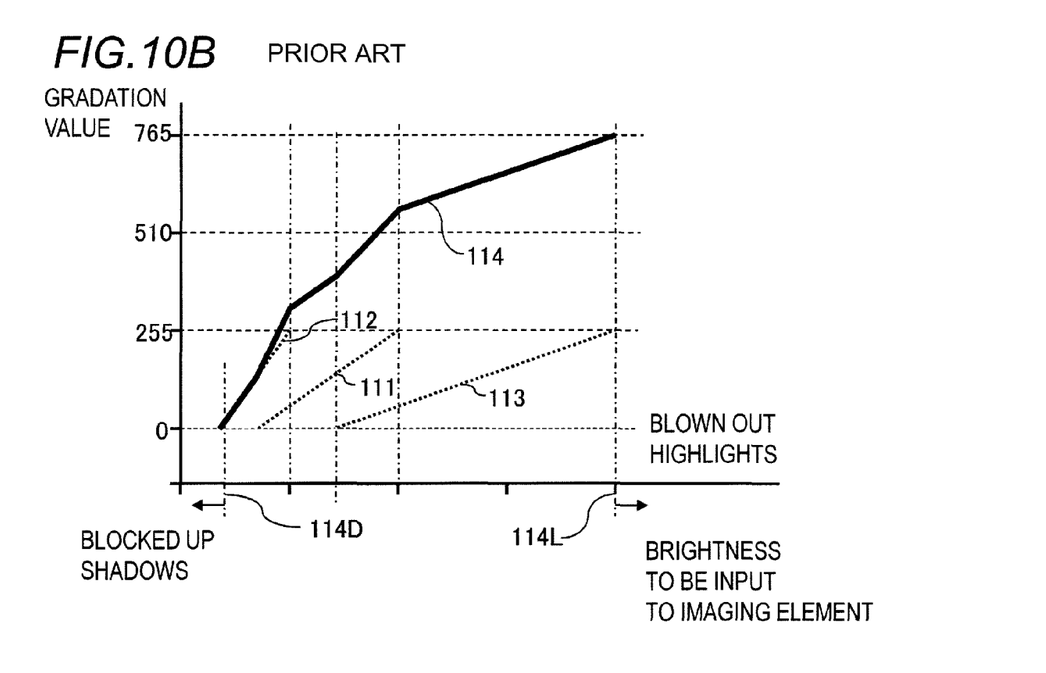

FIG. 10A and FIG. 10B are graphs for describing conventional high dynamic range (HDR) images. FIG. 10A shows the brightness to be input to an image sensor and the output of the image sensor, and FIG. 10B shows the brightness to be input to an image sensor and a gradation value of the HDR image.

In FIG. 10A, the abscissa is the brightness to be input to the image sensor, and the ordinate is an output gradation value of the image sensor, which is generated by converting the output of the image sensor into digital data by an analog/digital converter.

To simplify explanation, an 8-bit analog/digital converter is used in this example, where the output gradation value is shown as 0 to 255 data. A required number of levels of gradation (bit width) may certainly be used instead. In FIG. 10A, the dotted line 111 shows a relationship between the brightness to be input to an image sensor and an output gradation value of the image sensor when the image is captured with a correct exposure. The dotted line 112 shows a relationship between the brightness to be input to an image sensor and an output gradation value of the image sensor when the image is captured with overexposure. The dotted line 113 shows a relationship between the brightness to be input to an image sensor and an output gradation value of the image sensor when the image is captured with underexposure. In FIG. 10A, in the case of the correct exposure, the output gradation value is 0 if the brightness is lower than the brightness 111D which corresponds to the output gradation value 0, and the output gradation value is 255 if the brightness is higher than the brightness 111L which corresponds to the output gradation value 255, although these are not shown in order to avoid making the graph complicated. In other words, the gradation values other than the 0 to 255 range are clipped. In the case of overexposure and underexposure as well, the gradation values other than the 0 to 255 range are clipped.

In the case of normal photography without generating an HDR image, if an image is captured with a correct exposure, the output gradation value always becomes 0 if the brightness is lower than the brightness 111D, where the blocked up shadows are generated. The output gradation value always becomes 255 if the brightness is higher than the brightness 111L, where the blown out highlights are generated. The range of the brightness 111D to 111L corresponds to the dynamic range.

In order to solve these problems, when an HDR image is generated conventionally, an image is captured with underexposure or overexposure, and the obtained image is processed as described below, so as to expand the dynamic range (that is, the brightness at which the blocked up shadows are generated is decreased, and the brightness at which the blown up highlights are generated is increased).

The conventional method for generating an HDR image will be described with reference to FIG. 10B. In FIG. 10B, the abscissa is the brightness to be input to an image sensor, and the ordinate is the output gradation value of the image sensor and the gradation value of an HDR added image. The dotted lines 111, 112 and 113 show the brightness to be input to an image sensor and the output gradation value of the image sensor in the case of capturing an image with a correct exposure, in the case of capturing an image with overexposure, and in the case of capturing an image with underexposure respectively, as mentioned above.

The generation of an HDR image is processed in the blocks described in FIG. 9. To simplify explanation, it is assumed that the ratios A, B and C described in FIG. 9 are all 1. The output gradation values of the image sensor (dotted lines 111, 112, 113) are added in the addition block 109. The output of the addition block 109 is called an "HDR added image" here. The bold solid line 114 in FIG. 10B indicates the gradation values of the HDR added image. The HDR added image is converted into a required number of gradation levels by the gradation conversion block 110.

In the case of the solid line 114, as shown in FIG. 10B, the brightness at which the blocked up shadows are generated decreases down to the brightness indicated by 114D, and the brightness at which the blown out highlights are generated increases up to the brightness indicated by 114L. In other words, in the case of an HDR image, the dynamic range is expanded compared with the image captured with the correct exposure shown in FIG. 10A.

An HDR added image takes values from 0 to 765, as shown by the solid line 114, hence it is preferable to multiply the gradation value by ⅓ in the gradation conversion block 110 if this image is displayed on a display apparatus having 256 gradation levels.

In FIG. 10B, the form of the solid line 114 indicates the characteristics of the HDR image. The form of the solid line 114 can be changed depending on the set values of overexposure and underexposure and the ratios A, B and C described in FIG. 9, and can be designed to be an optimum characteristic form in a required dynamic range.

SUMMARY OF THE INVENTION

When the above mentioned high dynamic range processing is performed on a moving object, a plurality of photographs must be shot instantaneously changing exposure. In the case of a standard camera however, a several tens of msec. interval is required to allow for the next shot. As a result, when a plurality of photographs are composed, a problem called "double exposure" (triple exposure if three photographs are compared) occurs, where the contour portion of the moving object appears doubled.

Figure 11:
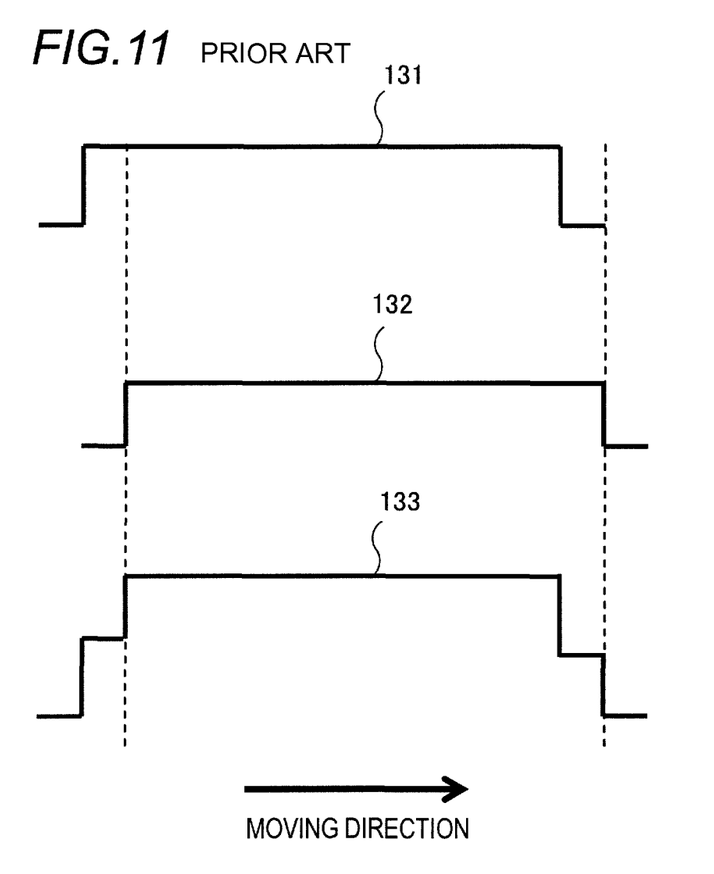
FIG. 11 is a diagram depicting double exposure according to the prior art.

This problem of the prior art will be described with reference to FIG. 11. FIG. 11 shows a gradation distribution of one line in the horizontal direction in a two-dimensional image, where the abscissa is a coordinate in the horizontal direction, and the ordinate is a gradation value.

It is assumed that a correctly exposed image and an overexposed image were sequentially captured while a square object, having a brightness color, is moving from left to right, in a uniform background. 131 in FIG. 11 is a gradation distribution of an image generated by multiplying the correctly exposed image by a ratio A, and 132 is a gradation distribution of an image generated by multiplying the overexposed image by a ratio B. 133 is a gradation distribution of an HDR image obtained by adding 131 and 132 and converting the gradation.

Since the square object is moving, the position of the square object in the image sensor moves because of an elapse of several tens of msec. from the capturing of the correctly exposed image to the capturing of the overexposed image. As a result, the edge portion of the HDR image becomes stepwise, as shown in the gradation distribution 133. This generates a double exposure-like image. In the case of a linear object of which width is very small, two lines appear in the generated image. Since this double exposure does not exhibit "natural tailing", which expresses motion in a standard photograph, a very ugly image is generated.

An available countermeasure to double exposure is computing a motion vector, and performing processing to correct a moved portion, as disclosed in Japanese Patent Application Laid-Open No. 2009-71821. However a motion vector cannot be perfectly computed, and in some cases a part of an edge of the moved portion becomes rugged in a composite photograph, and an ugly image is generated. Particularly in the case of a still image, it is difficult to extract a motion vector because few reference images are available. If there is a stripe pattern for which computing a motion vector is difficult, a drop in quality of the composite photograph becomes conspicuous.

There is another available method that solves the subtle mismatch of the boundary portion by performing blur processing in a method for generating a high dynamic range image by dividing the area of the image and separately performing image composition, as disclosed in Japanese Patent Application Laid-Open Nos. 2004-48445 and 2009-98718. However according to this method, images are composed after the blur processing, and therefore an image where the boundaries are unnaturally blurred is obtained.

With the foregoing in view, it is an object of the present invention to provide a technology which, when a still image in high dynamic range is generated from a plurality of still images obtained by continuously capturing images of a moving object, prevents the generation of double exposure and unnatural edges, and expresses the edge portion of the moving object with natural tailing.

It is another object of the present invention to provide a technology for displaying high quality still images and moving images in high dynamic range without generating double exposure and unnatural edges.

It is still another object of the present invention to provide a technology for easily generating a moving image in high dynamic range.

The present invention in its first aspect provides an image processing apparatus for generating a high dynamic range image using a plurality of images obtained by capturing images of a same object with different exposure values, including: an input unit for inputting a correctly exposed image generated with correct exposure and an incorrectly exposed image generated with exposure other than the correct exposure; a filter unit for performing low pass filter processing on the incorrectly exposed image; and a composition unit for generating a high dynamic range image by composing an output image of the filter unit with the correctly exposed image.

The present invention in its second aspect provides a display apparatus, including: an input unit for inputting a plurality of images obtained by capturing images of a same object with different exposure values; and a display unit for alternately displaying the plurality of images at a frequency of 70 Hz or higher.

The present invention in its third aspect provides an image capturing apparatus for capturing a moving image, including: an image capturing unit for capturing a moving image at a frequency of 70 Hz or higher; and a storage unit for storing the moving image captured by the image capturing unit, wherein the moving image is a moving image in which frames of images captured with different exposure values are alternately included.

According to the present invention, when a still image in high dynamic range is generated from a plurality of still images obtained by continuously capturing images of a moving object, the generation of double exposure and unnatural edges can be prevented, and the edge portion of the moving object can be expressed with natural tailing.

Also high quality still images and moving images in high dynamic range can be displayed without generating double exposure and unnatural edges.

Furthermore, a moving image in high dynamic range can be easily generated.

Further features of the present invention will become apparent from the following description of exemplary embodiments with reference to the attached drawings.

DESCRIPTION OF THE EMBODIMENTS

The present invention relates to a technology for generating a high dynamic range image (HDR image) using a plurality of images captured with different exposure values, and is particularly suitable for a purpose of obtaining an HDR image of a moving object. This technology can be applied to, for example, an image processing apparatus which generates one HDR image by composing a plurality of images captured with different exposure values, a display apparatus which continuously displays a plurality of images exposed at different exposure values so as to obtain the same visual effect as HDR, and an image capturing apparatus which captures and records a moving image in HDR.

Here the plurality of images captured with different exposure values include an image captured with a correct exposure value (this is called "correctly exposed image"), and an image captured at an exposure value other than the correct exposure value (e.g. underexposure, overexposure) (this is called "incorrectly exposed image"). One HDR image may be obtained from two images: one correctly exposed image and one incorrectly exposed image, or one HDR image may be obtained from a plurality of images: one or more correctly exposed image(s) and one or more incorrectly exposed image(s). "Correct exposure" is a standard exposure value which is determined by such conditions as the brightness of the object, so as to obtain natural gradation reproduction, and can also be called "standard exposure".

Embodiments of the present invention will now be described with reference to the accompanying drawings. The first to third embodiments are examples of applying the present invention to an image processing apparatus, the fourth embodiment is an example of applying the present invention to a display apparatus, and the fifth embodiment is an example of applying the present invention to an image capturing apparatus. The apparatuses described in the following embodiments can be installed as a part of the functions of a TV device, video record/regenerating apparatus, personal computer, digital camera, digital video camera, digital photo frame, portable telephone and game machine.

(First Embodiment)

Figure 1:
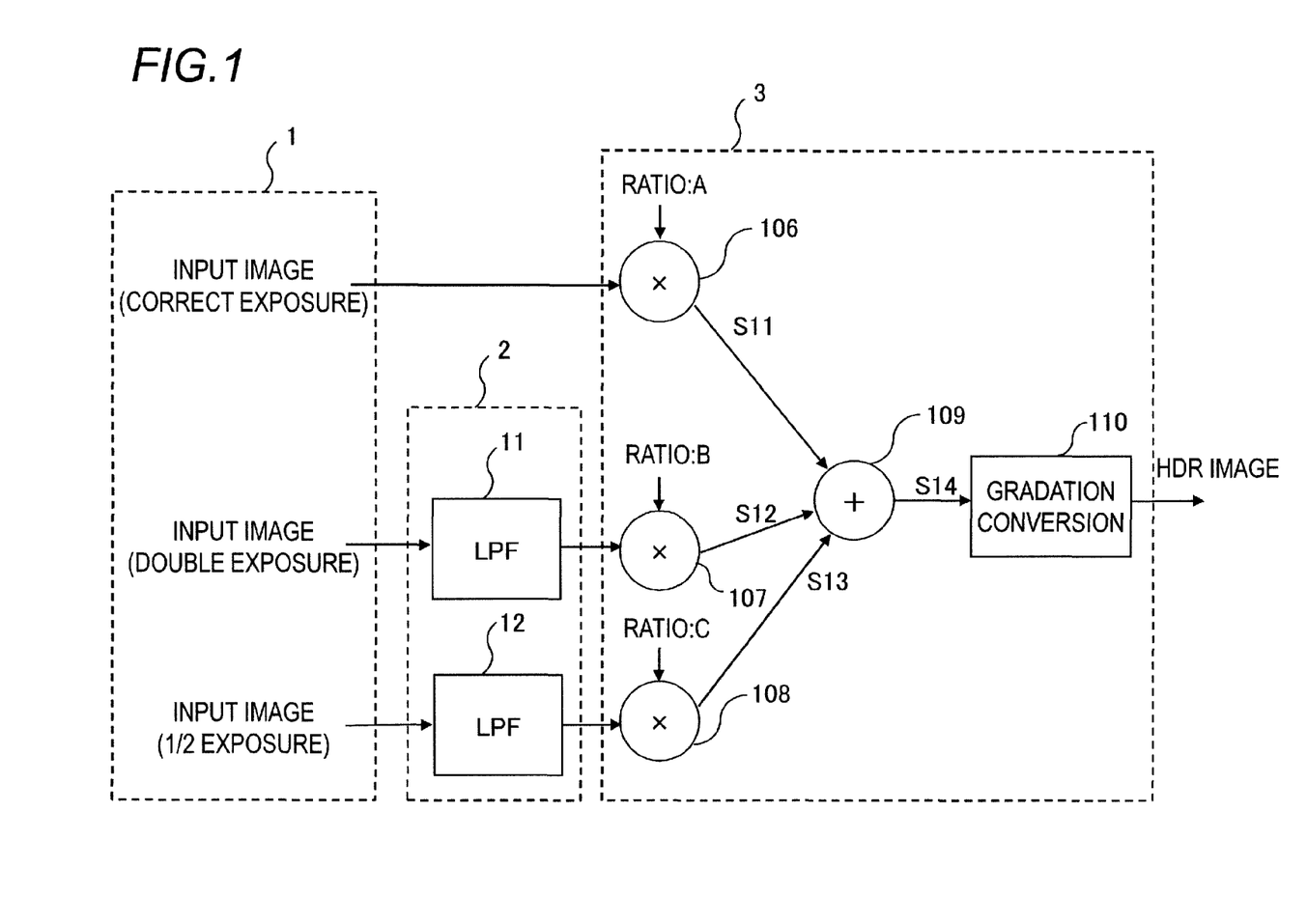
FIG. 1 is a functional block diagram of an image processing apparatus according to a first embodiment.

FIG. 1 is a functional block diagram of an image processing apparatus according to a first embodiment of the present invention.

This image processing apparatus comprises an input unit 1 for inputting a correctly exposed image and an incorrectly exposed image, a filter unit 2 for performing low pass filter processing for an incorrectly exposed image, and a composition unit 3 for generating an HDR image by composing an output image of the filter unit 2 with a correctly exposed image. Through the input unit 1, a correctly exposed image and two incorrectly exposed images (an overexposed image and an underexposed image) are input. The filter unit 2 has a low pass filter (LPF) 11, for eliminating high frequency components of an overexposed image, and a low pass filter (LPF) 12 for eliminating high frequency components of an underexposed image. The composition unit 3 has functional blocks 106, 107 and 108, an addition block 109, and a gradation conversion block 110. The functions of these blocks 106 to 110 are the same as those shown in FIG. 9. In FIG. 1, S11 is a correctly exposed image which was multiplied by a ratio A, S12 is an overexposed image which was processed with a low pass filter and was then multiplied by a ratio B, and S13 is an underexposed image which was processed with a low pass filter and was then multiplied by a ratio C. S14 is an output image of the addition block 109 (also called an "HDR added image").

For example, if an auto bracket function of a digital camera is used, three images (a correctly exposed image, overexposed image and underexposed image) can be compared at several tens of msec. of interval. These three images are input through the input unit 1. According to the first embodiment, the overexposed image is processed with the low pass filter 11, and the underexposed image is processed with the low pass filter 12. Then just like the case of FIG. 9, the functional blocks 106, 107 and 108 multiply the three types of images, that is, the correctly exposed image, the overexposed image after the low pass filter processing, and the underexposed image after the low pass filter processing, by predetermined ratios A, B and C respectively.

The images S11, S12 and S13 obtained like this are added by the addition block 109. As described in FIG. 10B, the gradation values of the overexposed image S12 after the low pass filter processing and the correctly exposed image S11 are added for a dark side. Gradation values of the underexposed image S13 after the low pass filter processing and the correctly exposed image S11 are added for a bright side. As a result, the composite image S14 is an image where the original image and the images processed with the low pass filters are mixed.

Figure 2:
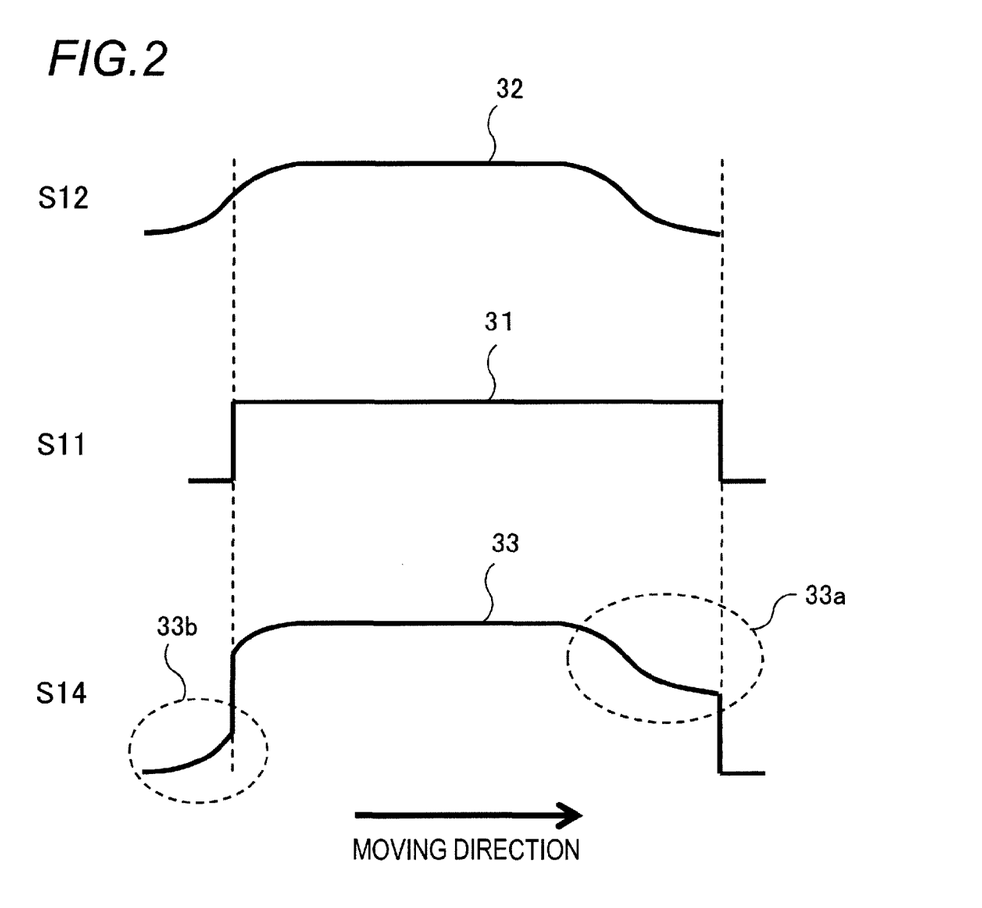
FIG. 2 is a diagram depicting an image composition according to the first embodiment.

FIG. 2 is a diagram depicting an image composition according to the present embodiment. FIG. 2 shows a gradation distribution of one line in the horizontal direction in a two-dimensional image, where the abscissa is a coordinate in the horizontal direction, and the ordinate is a gradation value. To simplify explanation, processing to generate an HDR image from two images of an overexposed image and a correctly exposed image will be described below. The case of composing an underexposed image can be considered in the same manner.

Just like FIG. 11, it is assumed that a square object having a bright color is moving from left to right in a uniform background. In this embodiment, an image of this object is captured in the sequence of overexposure and correct exposure. 31 in FIG. 2 indicates a gradation distribution of the image S11 generated by multiplying the correctly exposed image by the ratio A, and 32 indicates a gradation distribution of the image S12 generated by multiplying the overexposed image after the low pass filter processing by the ratio B. 33 indicates a gradation distribution of the composite image S14.

Since the square object is moving, the position of the square object in an image sensor moves as several tens of msec. of time elapses, from capturing the overexposed image to capturing the correctly exposed image. If the processing shown in FIG. 1 is applied to both of these images, the edge is maintained in the correctly exposed image as the gradation distribution 31 shows, but the edge of the overexposed image is transformed to an image S12 having gentle edges as the gradation distribution 32 shows, because of the low pass filter processing.

If these two images, S11 and S12, are added, the image S14 generated after the addition has the gradation distribution 33. As the gradation distribution 33 shows, the gradation slightly decreases in the front area of the square object in the moving (or traveling) direction (see 33a), but the gradation slightly increases in the rear area (see 33b). This kind of change of gradation of the edge portion is similar to "tailing", which is generated depending on the relationship of the shutter speed and the movement of the object during photo taking, and appears to be a natural image, unlike the double exposure in a prior art. In the case of a linear object of which width is very small, the line at the overexposed image side is blurred and does not standout because of the low pass filter, therefore a double line is not displayed in the composite image. Hence according to the present embodiment, the generation of double exposure and unnatural edges can be prevented when an HDR image is generated from a plurality of images, and the edge portion of a moving object can be expressed as a natural tailing.

For the sequence of capturing the correctly exposed image and the incorrectly exposed image, it is preferable to capture the incorrectly exposed image first. In the case of using both an overexposed image and an underexposed image as the incorrect exposed image, it is preferable to capture the images in the sequence of the overexposed image, the underexposed image and the correctly exposed image. This is because by using this image capturing sequence, a more natural tailing can be generated.

The present invention is not limited to the configuration of the above embodiment, but can be other configurations if the object, effect and result are the same as the above mentioned configuration. For example, the incorrectly exposed image after the low pass filter processing may be directly added to the correctly exposed image, without multiplying each image by the ratios A to C.

For the input image, it is preferable to use an image of which gradation value is in proportion to the brightness (linear type image). In the case of using a gamma type image, such as a JPEG image, it is preferable that the above mentioned HDR composition processing is performed after the gamma type image is converted into a linear type image. The HDR image to be output can be converted from the linear type into the gamma type if necessary. It is also possible that the above processing is performed on the gamma type image without conversion, by setting the ratios A, B and C appropriately at composition. In the case of performing the HDR composition processing on a gamma type image however, the contrast curve changes somewhat.

(Second Embodiment)

A second embodiment of the present invention will now be described with reference to FIG. 3 and FIG. 4. In the second embodiment, a method for decreasing "blurring (or fuzziness)" and "tailing" in an HDR image is shown.

Figure 3:
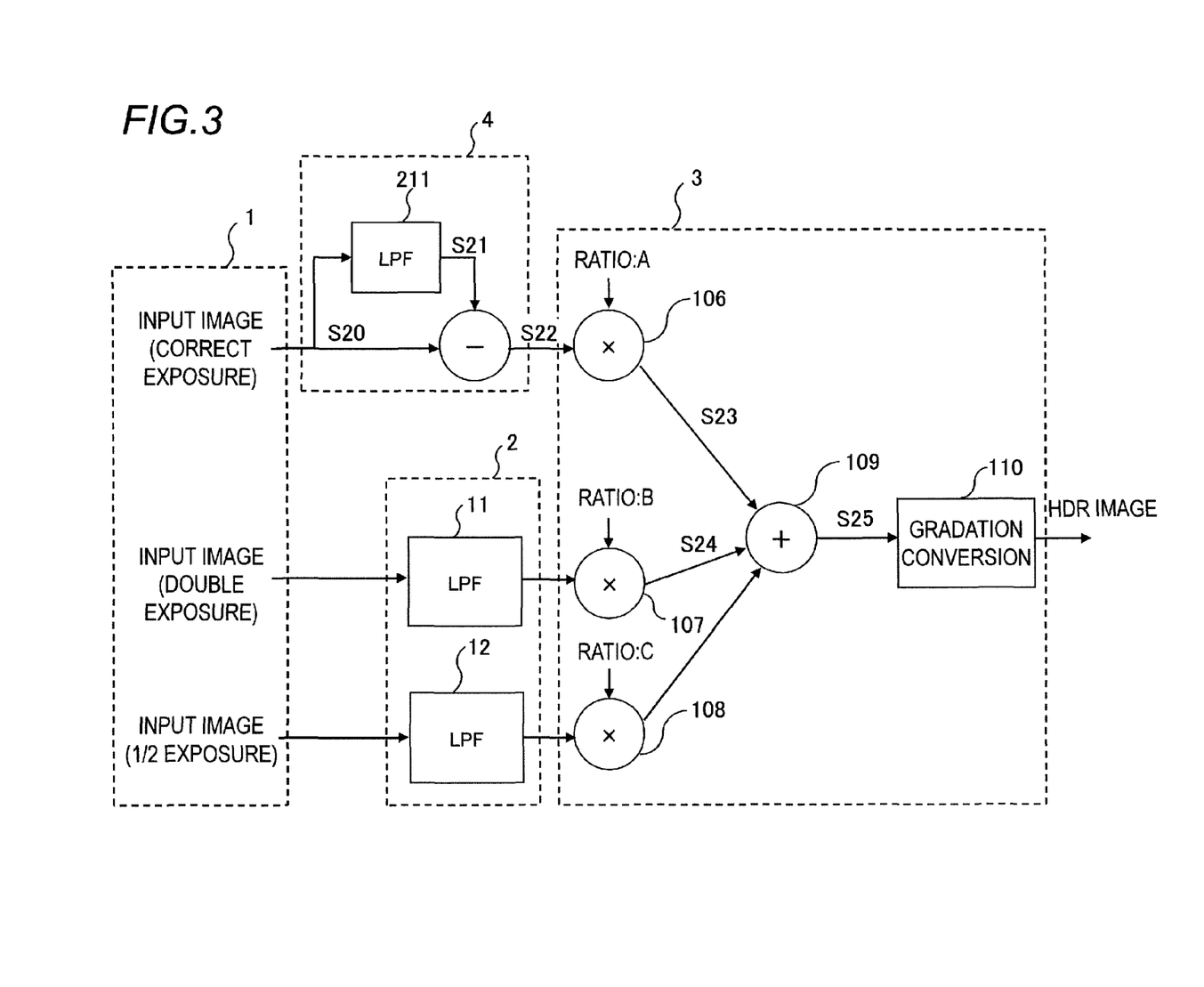
FIG. 3 is a functional block diagram of an image processing apparatus according to a second embodiment.

FIG. 3 is a functional block diagram of an image processing apparatus according to the second embodiment of the present invention.

A difference of this image processing apparatus from that of the first embodiment is that it has a correctly exposed image adjustment unit 4, which performs processing to decrease the low frequency components from a correctly exposed image. The rest of the configuration (the input unit 1, the filter unit 2, the composition unit 3) is the same as that of the first embodiment.

The correctly exposed image adjustment unit 4 has a low pass filter 211 which performs low pass filter processing for a correctly exposed image, and a subtraction block 212 which subtracts the correctly exposed image S21 after performing the low pass filter processing from the correctly exposed image S20 before performing the low pass filter processing. According to this embodiment, an adjusted correctly exposed image S22, which is output from the subtraction block 212, is used for the HDR composition.

An image close to the original correctly exposed image S20 can be obtained in a gradation range of the correctly exposed image by using, for the HDR composition, the image S22 generated by subtracting the low frequency components from the correctly exposed image. This will be described with reference to FIG. 4.

Figure 4:
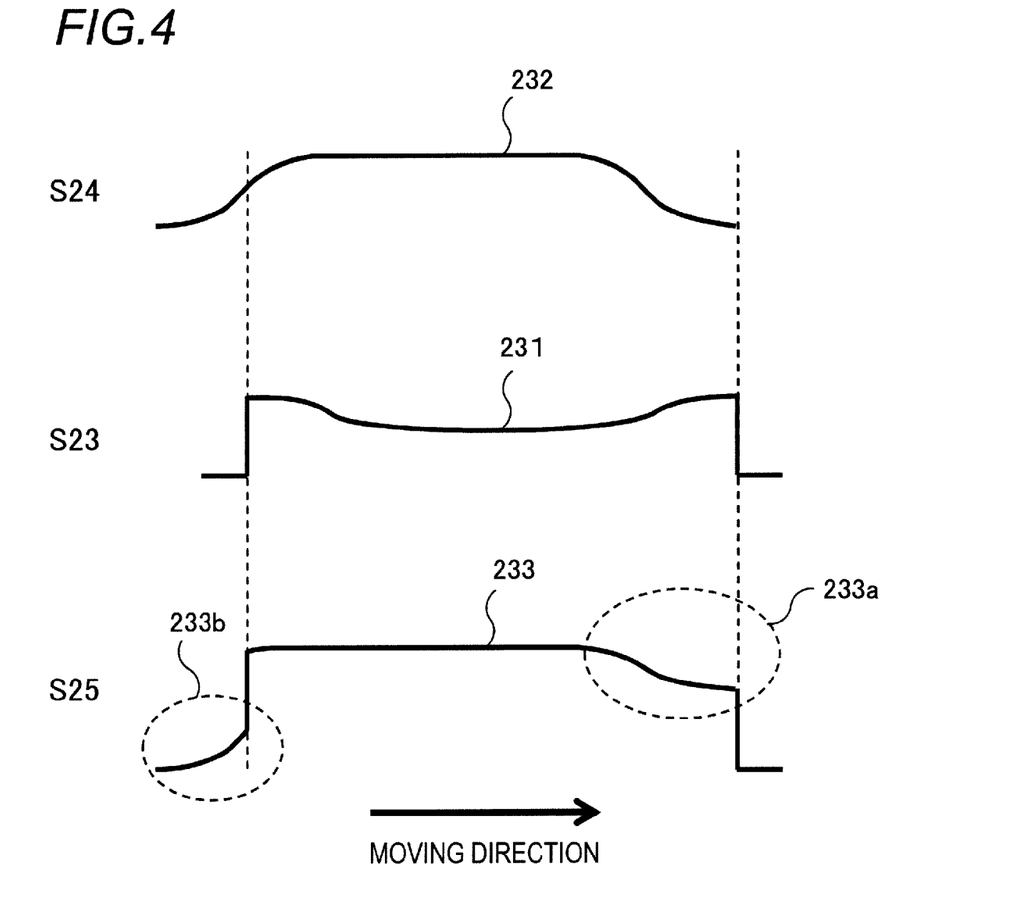
FIG. 4 is a diagram depicting an image composition according to the second embodiment.

FIG. 4 is a diagram depicting the image composition of the second embodiment. An example when the same correctly exposed image and overexposed image as the case of the first embodiment (FIG. 2), were input, is shown. 231 of FIG. 4 indicates a gradation distribution of an image S23 generated by multiplying the adjusted correctly exposed image S22 by the ratio A, and 232 indicates a gradation distribution of an image S24 generated by multiplying the overexposed image after the low pass filter processing by the ratio B. 233 indicates the gradation distribution of the composite image S25.

Since the square object is moving, the position of the square object in the image sensor moves as several tens of msec. of time elapses from capturing the overexposed image to capturing the correctly exposed image. If the processing shown in FIG. 3 is applied to both of these images, the low frequency components are subtracted from the correctly exposed image, therefore a gradation distribution 231 is generated such that the edges are maintained, and the center portion where brightness does not change much is concave. For an overexposed image, on the other hand, a gradation distribution 232 having gentle edges is generated by the low pass filter processing.

The composite image S25 of these images as well has a gradation distribution 233 where the gradation slightly decreases in the front area of the square object in the moving direction (see 233a), and the gradation slightly increases in the rear area (see 233b), just like the first embodiment. Therefore the moving object can be expressed with a natural "tailing".

Here attention is paid to the gradation in the center portion of the square object. While the low frequency components are subtracted from the image S23, the image S24 has low frequency components. Therefore if the image S23 and the image S24 are added, the gradation distribution in the center portion of the square object becomes generally flat. As a result, "blurring (or fuzziness)" and "tailing" decrease more than the first embodiment, and a higher quality HDR image can be obtained.

(Third Embodiment)

A third embodiment of the present invention will now be described with reference to FIG. 5, FIG. 6A and FIG. 6B. In the third embodiment, a method for further improving the quality of the HDR image by performing the low pass filter processing only on a predetermined gradation portion in an incorrectly exposed image is shown.

Figure 5:
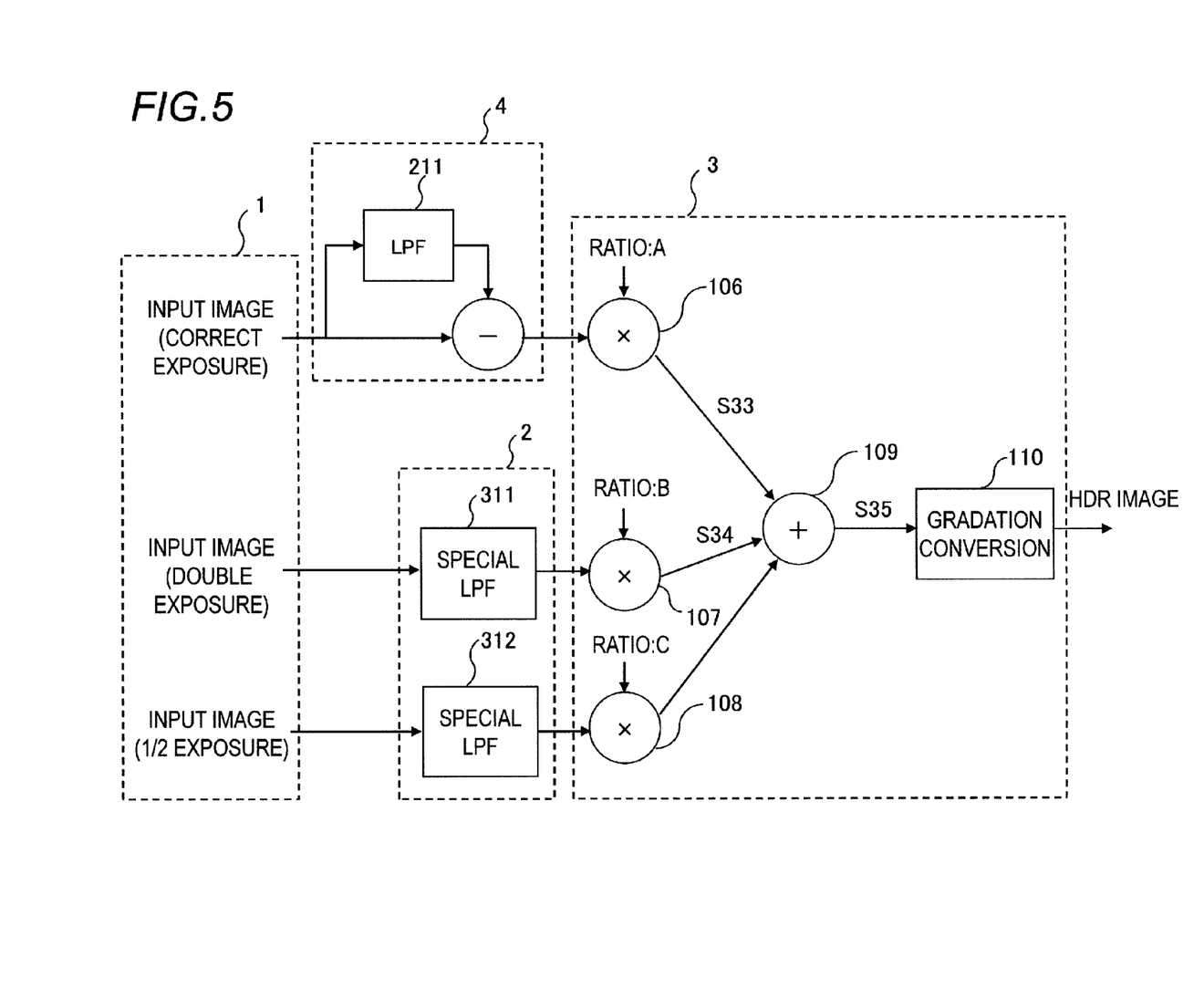
FIG. 5 is a functional block diagram of an image processing apparatus according to a third embodiment.

FIG. 5 is a functional block diagram of an image processing apparatus according to the third embodiment of the present invention.

A difference of this image processing apparatus from that of the second embodiment is that the filter unit 2 has special low pass filters 311 and 312. The rest of the configuration (the input unit 1, the composition unit 3, the correctly exposed image adjustment unit 4) is the same as that of the second embodiment.

The special low pass filter 311 is a special filter for performing the low pass filter processing only for a gradation portion that is brighter than a predetermined threshold TH1 in an overexposed image (in other words, filter processing is turned OFF for a gradation portion that is darker than the threshold TH1). The special low pass filter 312 is a special filter for performing low pass filter processing only for a gradation portion that is darker than a predetermined threshold TH2 in an underexposed image (in other words, filter processing is turned OFF for a gradation portion that is brightness than the threshold TH2). According to the present embodiment, the thresholds TH1 and TH2 are set to the minimum value (111D in FIG. 10A) and the maximum value (111L in FIG. 10A) of the dynamic range of the correct exposure respectively. The values of the thresholds TH1 and TH2, however, are not limited to these values, but can be set to any appropriate values.

Figure 6A:
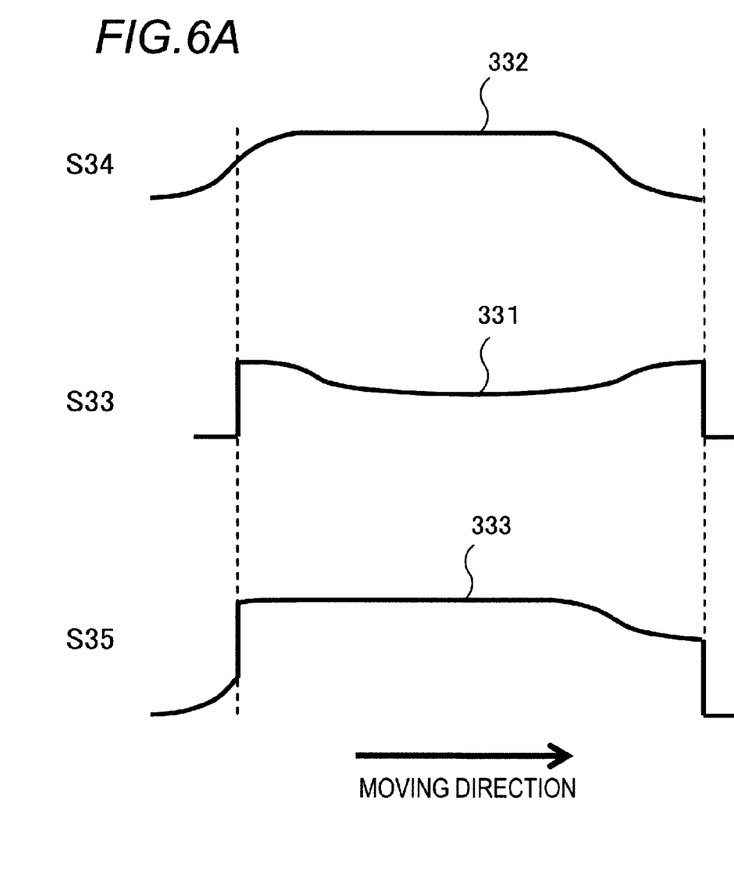
FIG. 6A and FIG. 6B are diagrams depicting an image composition according to the third embodiment.
Figure 6B:
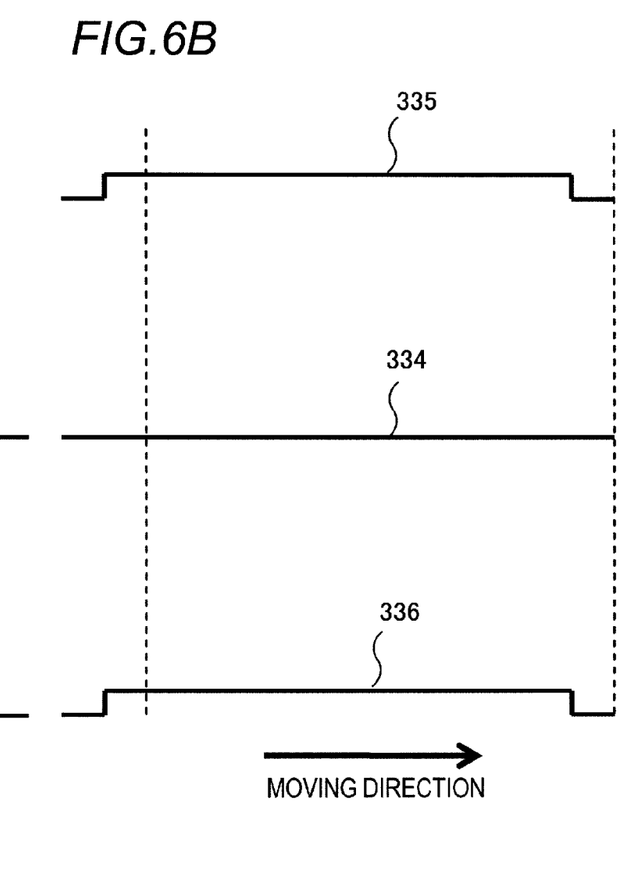

FIG. 6A and FIG. 6B are diagrams depicting the image composition of the third embodiment. FIG. 6A shows an example when the same correctly exposed image and overexposed image as in the case of the first embodiment (FIG. 2) are input. FIG. 6B is an example when a correctly exposed image and an overexposed image, obtained by capturing an image of a square object darker than the case of FIG. 6A, are input. 331 and 334 indicate the gradation distributions of the image S33 in FIGS. 5, 332 and 335 indicate the gradation distributions of the image S34, and 333 and 336 indicate the gradation distributions of the composite image S35.

In the case of the bright object in FIG. 6A, a composite image S35, which is the same as the second embodiment, is obtained. Hence just like the second embodiment, a high quality HDR image expressing a natural tailing (see 333) is generated.

The case of the dark object in FIG. 6B is considered. If the brightness of this object is a brightness level that is not captured with a correct exposure, the gradation of the image S33 becomes 0 (see 334). In the case of an overexposed image, the low pass filter is turned OFF since the brightness of this object is lower than the threshold TH1, and a gradation distribution 335, which is the same as the image which was input, is obtained. Therefore in the gradation distribution 336 of the composite image S35, there is no edge blur generated by the low pass filter, and the edge of the original object is maintained. In the case of an underexposed image, a high quality image, without edge blur in the gradation portion higher than the threshold TH1, is obtained, although this is not shown in FIG. 6B.

As described above, according to the present embodiment, an even higher quality HDR image than the second embodiment, with less "blurring (or fuzziness)" and "tailing" can be obtained.

(Fourth Embodiment)

In the first to third embodiments, examples of generating one HDR image from a plurality of input images and displaying this HDR image were described.

Recently display apparatuses that can display images at high-speed, such as 120$p$, are increasing. If a plurality of images are displayed with switching them at high-speed in such a display apparatus, viewers see a composite image of these images. Therefore if a filter processing the same as the first to third embodiments is performed on a plurality of input images captured with different exposure values, and these images are repeatedly and continuously displayed, then the viewers see an HDR image, which is a composed result.

Figure 7:
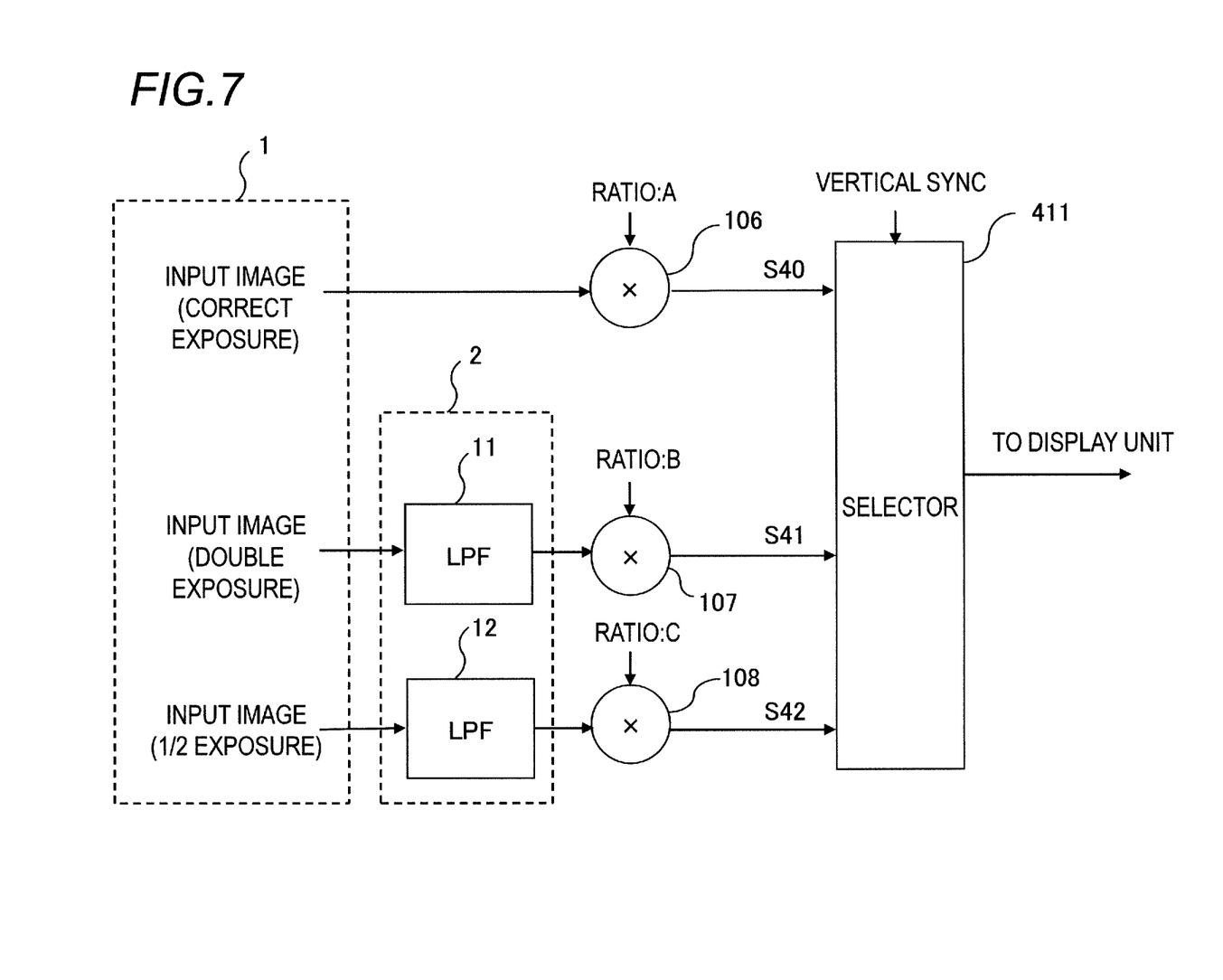
FIG. 7 is a functional block diagram of a display apparatus according to a fourth embodiment.

FIG. 7 is a functional block diagram of a portion to perform the high dynamic range processing in a display apparatus according to the fourth embodiment of the present invention. A block denoted with a same reference mark as FIG. 1 has a same function as that in the first embodiment. A difference from the first embodiment is that a selector 411, for switching images to be displayed on a display unit in frame units, is disposed, instead of the addition block 109.

The selector 411 alternately displays a correctly exposed image (S40) and incorrectly exposed images (S41, S42) alternately at a predetermined display frequency according to the vertical synchronization. Here in order to suppress the generation of flicker, the display frequency to alternately display two images is set to 70 Hz or higher, and the display frequency to alternately display three images is set to 100 Hz or higher.

In the case of the images to be displayed in FIG. 2, images actually displayed are the two images having the gradation distributions 31 and 32, but these images are composed in the eyes of the viewer, and look like an images having the gradation distribution 33, since these images switch at high-speed. Thus a high quality HDR images can be obtained using a simple configuration.

In the fourth embodiment, an example of performing the same filter processing as the first embodiment was described, but the configuration of this invention is not limited to this. The correctly exposed image adjustment unit mentioned in the second embodiment or the special low pass filters mentioned in the third embodiment may be added to the configuration of the fourth embodiment. It is also possible to omit the filter unit 2 from the configuration in FIG. 7, so that the correctly exposed images and the incorrectly exposed images, which are input through the input unit 1, are displayed as is.

(Fifth Embodiment)

In the first to fourth embodiments, examples of displaying a high dynamic range image from still images were described. In the first to third embodiments, a method for composing a high dynamic range image from a plurality of still images captured with different exposure values were described. In the fourth embodiment, it was shown that high dynamic composition becomes possible in the eyes of the user by continuously displaying a plurality of images captured with different exposure values.

However display apparatuses can display moving images, and those that can display moving images at high-speed, such as 120$p$, are increasing lately. In such a display apparatus, viewers see a composite image even in moving images by displaying images captured with different exposure values alternately, just like the case of the still images shown in the fourth embodiment.

If the moving image in which a frame of a correctly exposed image and a frame of an incorrectly exposed image are alternately included are generated, and these moving images are displayed, then high dynamic range images can be provided to viewers.

Figure 8A:
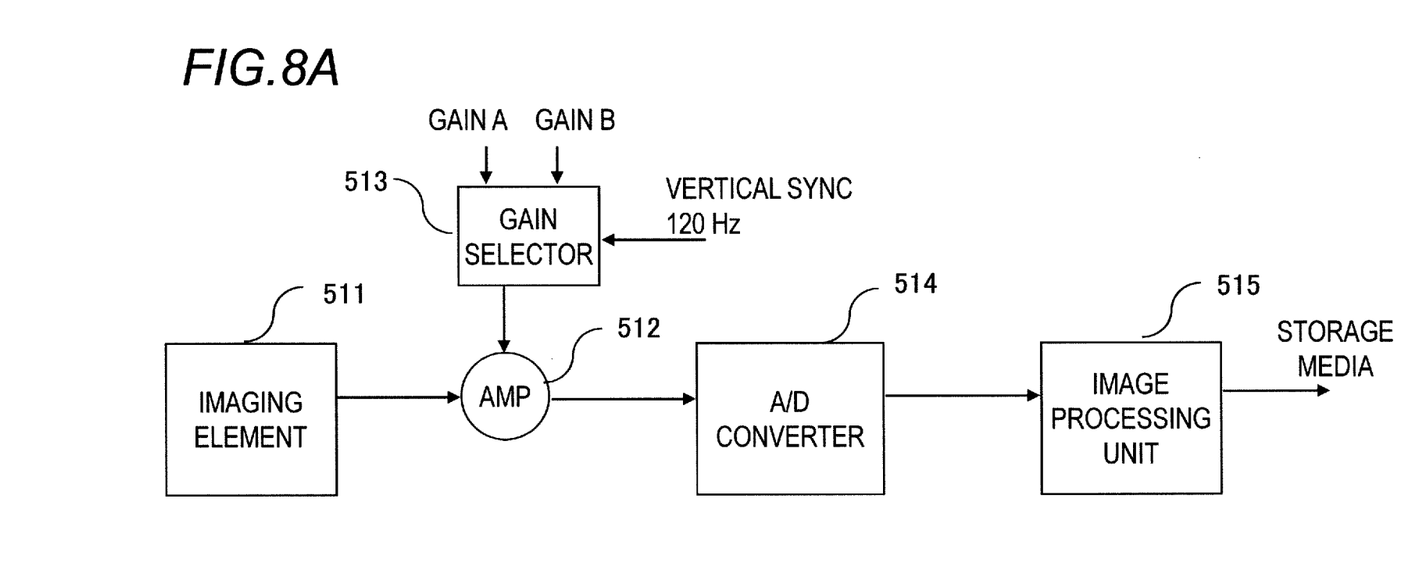
FIG. 8A and FIG. 8B are functional block diagrams depicting an image capturing apparatus and a display apparatus according to a fifth embodiment.
Figure 8B:
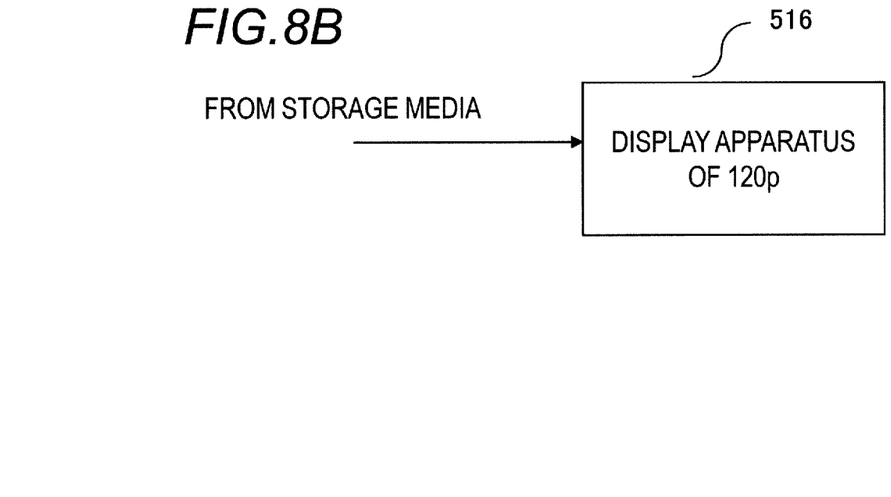

Configurations of an image capturing apparatus and a display apparatus according to the fifth embodiment will now be described with reference to FIG. 8A and FIG. 8B. The image capturing apparatus has an image sensor 511, an amplifier 512, a gain selector 513, an A/D converter 514 and an images processor 515. The image sensor 511 is an image capturing unit for capturing a moving image, and is constituted by a CCD or CMOS. The amplifier 512 has a function to convert the output voltage of the image sensor 511. The gain selector 513 has a function to switch a gain of the amplifier 512 between "correct level", "over level" and "under level". The A/D converter 514 has a function to convert the output of the amplifier 512 into digital signals. The image processor 515 has a function to perform such processing as image quality adjustment and compression by digital computation. The moving images which are output from the image processor 515 are recorded in a storage media. 516 is a display apparatus for displaying the moving images.

In the case of a moving image in which two types of exposure images are alternately displayed, the display frequency thereof must be set to a 70 Hz or higher value, such as 120 Hz, in order to suppress the generation of flicker.

In the case of an example of a 120 Hz operation, the image sensor 511 is moved with a shutter speed (storing speed) of 1/125 of a sec. or less, and the light signals which formed an image using a lens, which is not illustrated, are converted into electric signals. Then the electric signals are amplified using the amplifier 512, and at this time, the following two types of amplification factors are switched at a 120 Hz timing, and repeatedly used. The ISO sensitivity changes by changing the amplification factor.

Gain A: amplification factor that is somewhat higher than the correct exposure (about ×1.5 to ×2)
Gain B: amplification factor that is somewhat lower than the correct exposure (about ×0.7 to ×0.5)

Then a signal for a slightly overexposed image level and a signal for a slightly underexposed image level are alternately obtained at a 120 Hz frame frequency. These signals are digitized data by the A/D converter 514. The image processor 515 converts the RAW data of the image sensor into an RGB image, and then performs image quality adjustment, such as gamma adjustment, and compresses the images if necessary. The image processor 515 however does not perform sensitivity adjustment (exposure adjustment).

Thus moving images, in which a bright image frame which is slightly overexposed and a dark image frame which is slightly underexposed are repeated, are obtained. In a bright image frame, blown out highlights may exist, and in a dark image frame, blocked up shadows may exist.

According to this embodiment, moving images, which continue at 120 Hz, are captured, so the low pass filters 11 and 12 shown in FIG. 1 may be used but are not essential. In the case of generating moving images at 120 Hz from moving images at 60 Hz, however, the low pass filters are required, just like the cases of the first to fourth embodiments.

The moving images obtained like this are recorded in such a storage media (storage unit) as a non-volatile memory, HDD and tape. In other words, according to the image capturing apparatus of this embodiment, moving images, in which the frames of images captured with different exposure (sensitivity) values appear alternately, are generated and stored.

The means of changing the exposure value is not limited to the above mentioned amplifier 512 for changing sensitivity. The exposure can be changed just the same by continuously changing the diaphragm (not illustrated) of the video camera, or continuously changing the electronic shutter speed of the image sensor 511.

The moving images recorded by the above mentioned means are sent to the high-speed moving image display apparatus 516 at a same frequency value used for capturing the images (120 Hz in this case). The high-speed moving image display apparatus 516 continuously displays the moving images which were input (without composing). Thereby a bright image frame and a dark image frame are repeatedly displayed at a speed which does not allow the viewer to sense flicker.

Then the eyes of the viewer recognize these images as moving images, where a bright image frame and a dark image frame are composed. The blown out highlights existing in the bright image frame look normal after composition, since the dark image frame has gradation. The blocked up shadows existing in the dark image frame look normal after composition, since the bright image frame has gradation. Therefore the viewer visually recognizes the composite result as a high dynamic range image.

In the above embodiment, a case of changing two types of exposure values was described, but a similar effect can be obtained even if three types of exposure values are changed. In the case of three types, using a frame of an underexposed image, a frame of a correctly exposed image and a frame of an overexposed image is appropriate, since the dynamic range spreads to both sides in the bright and dark directions. However to generate images attaching greater importance to the gradation in the darker portion, a plurality of frames of an overexposed image may be used for one frame of a correctly exposed image. To generate imaging attaching greater importance to the gradation in the bright portion, on the other hand, a plurality of underexposed images may be used for one frame of a correctly exposed image.

In the above embodiment, one camera is used for capturing images, but two cameras of which exposure values are different may be used to capture images of a same object. By reediting the two images captured and recorded by each camera so that frames captured with different exposure values are arranged alternately, the same function as the above mentioned one camera can be implemented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-092541, filed on Apr. 13, 2010, which is hereby incorporated by reference herein in its entirety.

What is claimed is:

1. An image capturing apparatus for capturing a moving image, the apparatus comprising:
   an image capturing unit configured to capture a moving image, the moving image including a plurality of frames of images alternately captured with different exposures which include a correct exposure and an incorrect exposure; and
   a filter unit configured to perform low pass filter processing on a frame of an image with the incorrect exposure;

an adjustment unit configured to perform processing to decrease the low frequency components on a frame of an image with the correct exposure; and a composition unit configured to input an output image of the filter unit and an output image of the adjustment unit, and to generate a high dynamic range image composed of the output image of the filter unit and the output image of the adjustment unit.

2. The apparatus according to claim 1, further comprising a display unit configured to display the moving image at a frequency of 70 Hz or higher.

3. The apparatus according to claim 1, further comprising a storage unit configured to store the moving image captured by the image capturing unit.

4. The apparatus according to claim 1, wherein the image capturing unit changes the exposure by at least one of (a) changing sensitivity of an amplifier configured to amplify an output signal of an image sensor, (b) changing a diaphragm of a camera lens, and (c) changing an electronic shutter speed of the image sensor.

5. The apparatus according to claim 1, wherein the image capturing unit captures the moving image at a frequency of 70 Hz or higher.

* * * * *